Jan. 13, 1970  D. DUDYCH ET AL  3,489,529
REACTOR WITH FLOATING FLUID DISTRIBUTOR MEANS
Filed Jan. 31, 1967  2 Sheets-Sheet 1

INVENTORS:
Daniel Dudych
Walter W. Heinze
Lawrence D. Humbard
BY: James R. Hoatson, Jr.
Philip T. Liggett
ATTORNEYS Jan. 13, 1970   D. DUDYCH ET AL   3,489,529
REACTOR WITH FLOATING FLUID DISTRIBUTOR MEANS
Filed Jan. 31, 1967   2 Sheets-Sheet 2

INVENTORS:
Daniel Dudych
Walter W. Heinze
Lawrence D. Humbar(

BY: *James R. Hoatson, Jr*
*Philip T. Liggett*
ATTORNEYS

United States Patent Office 3,489,529
Patented Jan. 13, 1970

3,489,529
REACTOR WITH FLOATING FLUID
DISTRIBUTOR MEANS
Daniel Dudych, Des Plaines, Walter W. Heinze, Chicago, and Lawrence D. Humbard, La Grange Park, Ill., assignors to Universal Oil Products Company, Des Plaines, Ill., a corporation of Delaware
Filed Jan. 31, 1967, Ser. No. 612,966
Int. Cl. B01f 9/04, 9/00
U.S. Cl. 23—285                      7 Claims

ABSTRACT OF THE DISCLOSURE

A reactor having transverse fluid distributor means which is supported on and between beds of subdivided contact material maintained within the reactor chamber, whereby the distributor means in effect "floats" on the contact material and there can be an elimination of support rings or lugs and the like, which are otherwise required to support the distributor under operating conditions.

---

Figure 1:
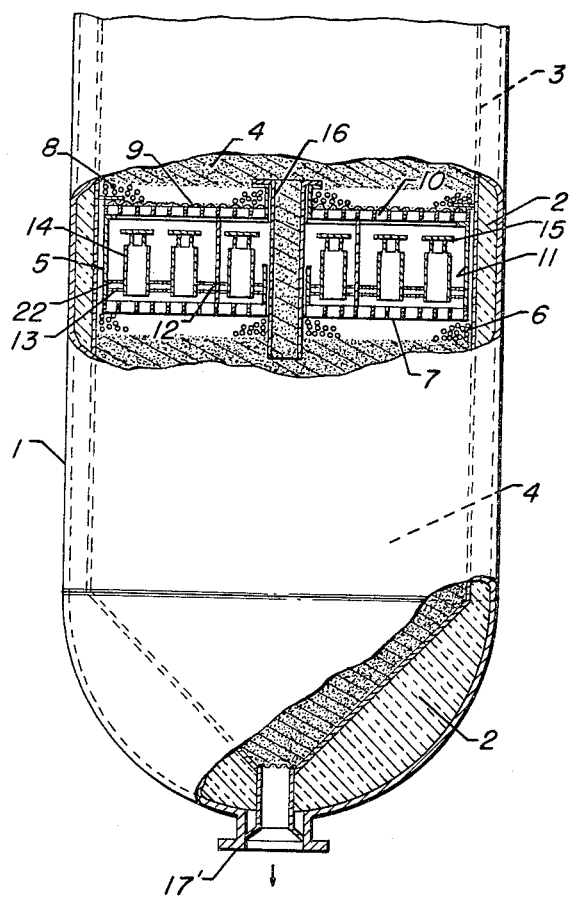

The present invention relates to a reactor having one or more "floating" fluid distributor units spaced therein. More particularly, the invention is directed to a unitary reactor system with transverse fluid distributor means adapted to be supported on and between beds of subdivided contact material maintained within a lined or unlined reactor chamber such that there are no supporting rings or brackets necessary along the inside of a liner or shell to support the distributing unit under operating conditions.

There are various kinds of decks or fluid redistributing means which have been utilized in connection with contacting chambers, particularly those which have beds of solid particulated catalyst or other contact material, such that there is a periodic redistribution of fluid material through the elongated reactor chamber. Such redistribution means may comprise perforated sieve-deck constructions or bubble-tray type of designs without downspouts or means for effecting a side to side fluid flow. In other words, various distributor means are adapted to effect a collection and subsequent uniform redistribution of the fluid stream. The fluid may be in a vapor or liquid phase, or even in a mixed phase, such that the stream is at least periodically uniformly redistributed into the contact bed, or series of vertically spaced beds maintained vertically within an elongated contacting chamber. Generally, the use of such redistribution means is in connection with catalyst contacting reactors such as used in the hydrocarbon conversion field or in connection with various chemical reactions. Also, generally, the conventional trays or redistribution plate means which have heretofore been used in connection with reactor chambers have made use of supporting rings or bracket means directly attached to the inside wall of the chamber. The attachment of the rings or supporting lugs to a reactor shell, or particularly to a thin liner within a reactor, creates a problem in that the shell or liner must be strengthed in a suitable manner to withstand the heavy concentrated loads from pressure differentials and from the weight of catalyst or contact material carried above each redistributor. This in turn causes localized stresses to be set up within the reactor liner or chamber wall and increases the problem of stress corrosion. In other words, where there can be an elimination of heavy concentrated loads carried to a liner or to a reactor outer wall, there can be an elimination of the problem of shell reinforcement along with the elimination of increased corrosion resulting from highly concentrated stress patterns.

Thus, it may be considered a principal object of the present invention to provide a unitary reactor system with transverse fluid distributor means which in turn is adapted to be supported on and between beds of subdivided contact material maintained within the chamber, whereby the distributor means in effect "floats" on the contact matreial and there can be an elimination of support rings or lugs and the like, which are otherwise required to support the distributor under operating conditions.

It may also be considered an object of the present invention to provide an improved distributor construction and design which is not only adapted to be placed directly in contact with and between beds of subdivided material but, in addition, can operate to uniformly redistribute a fluid stream where there may be a partial tipping or unevenness to the distributor itself due to the uneven settlement of the catalyst bed or to improper placement of the catalyst or other contact material at the time of installation.

While the improved distributor means is particularly adapted for use within a lined reactor so as to preclude attachment to what will generally be a quite thin liner section of stainless steel or other resistant metal (or of protective coating material on a base material), it may be noted that the present floating distributor means may well be utilized within a conventional unlined reactor chamber.

Broadly, the invention may be considered as covering a unitary reactor system with transverse distributor means adapted to be supported on and between beds of subdivided contact material maintained therein, which comprises in combination, a pressure tight reactor chamber with at least a fluid inlet and fluid outlet means thereto providing for fluid flow longitudinally therethrough, at least one relatively compact bed of subdivided contact particles maintained within the said reactor chamber, and at least one fluid stream distributing unit supportable on said bed of contact particles therein, with such section comprising, a lower supporting grating sized to traverse the interior cross-section of the reactor chamber without attaching to said liner, a peripheral ring section extending upwardly from said support grating and spaced a short distance inwardly from the inner wall of said reactor, a plurality of spaced parallel transverse support ribs extending upwardly from said support grating for a height equal to said ring section, perforate plate means above said grating providing uniform fluid passageway means for a descending fluid flow, a plurality of spaced apart open-ended fluid flow tubes extending through said perforate plate means for a short distance thereabove providing for flow (vapor and/or liquid) through said distributor section, a plurality of spaced transverse vertical baffle members extending upwardly from said perforate plate means at right angles with respect to said support ribs, to provide a compartmentalized crate arrangement and a resulting substantially uniform downward liquid flow across and through said perforate plate means, and particle retaining stiffened screening means extending laterally over said support ribs and said peripheral ring to preclude solid material passing to said perforate plate means of the distributor section.

It will be noted that a particular advantage is attained in connection with the present improved construction by virtue of having cross ribs or baffling means such that there can be retention of a descending liquid material within a plurality of crate-like sections. For example, if there were no cross baffle members constructed into the distributor means and there was a settlement and tipping of the distributor across a large diameter chamber, there could perhaps be as much as a 5 inch or more settlement of one side with respect to the other and all of the liquid would be channeled to the low side of the unit. However, the incorporation of cross stiffening ribs or joists in combination with additional baffle members at right angles to the rib means will result in a subdivided crate or compartmentalized arrangement. Each compartment will be capable of holding a level of descending liquid and redistributing it through the lower perforate plate means in a uniform rain-like flow to the next lower bed of catalyst or contact material. While the present design is particularly adapted to insure a uniform redistribution of a descending liquid phase, it should be noted that the construction is equally suitable for handling a vapor phase flow passing longitudinally through the reactor chamber, or alternatively, adapted to accommodate a mixed vapor-liquid phase flow system.

A preferred distributor design incorporates a dual layer of perforate plate means across the unit, between upper and lower open grate support means, such that there can be a regulated control of fluid flow through the unit and greater uniformity of redistribution across the entire cross-sectional area of the reactor chamber for a liquid flow that may vary from start of run to end of run. More specifically, there is provided a perforate top plate member with a restricted number of holes or openings for regulating low liquid flow in combination with an adjacent somewhat more open lower perforate plate member for regulating high liquid flow. These two perforated plates permit a relatively uniform fluid flow to pass to the contacting material below in a controlled manner in the manner of a "rain deck." The result is a substantially uniform redistribution flow through the grating to the next lower bed of contacting material.

In still another modification, particularly in connection with lower or intermediate redistribution units, there may be provided one or more catalyst withdrawal tubes which extend vertically through the redistribution unit to permit particulates to be withdrawn from the entire chamber by way of a lower manhole or nozzle at the bottom of the reactor chamber. In other words, catalysts can be permitted to flow or cause to be pushed and channeled downwardly from one bed to another through an open-ended catalyst withdrawal tube at the zone of each redistributor unit. At the time of installation of the inner units and contact material, and during the operating period, each of the catalyst tubes will of course be filled with catalyst or other contact material such that there is no open zone for the liquid or vapors to bypass a fluid redistributor at each such level in the contact chamber.

Reference to the accompanying drawing and the following description thereof will serve to show one embodiment of the present invention, as well as point out additional advantageous features which may be obtained with the use of the floating type of distributor unit within a reactor system.

FIGURE 1 of the drawing illustrates in a partial elevational view the placement of a floating distribution unit within a vertically elongated reactor chamber accommodating a catalyst or other contact material.

Figure 2:
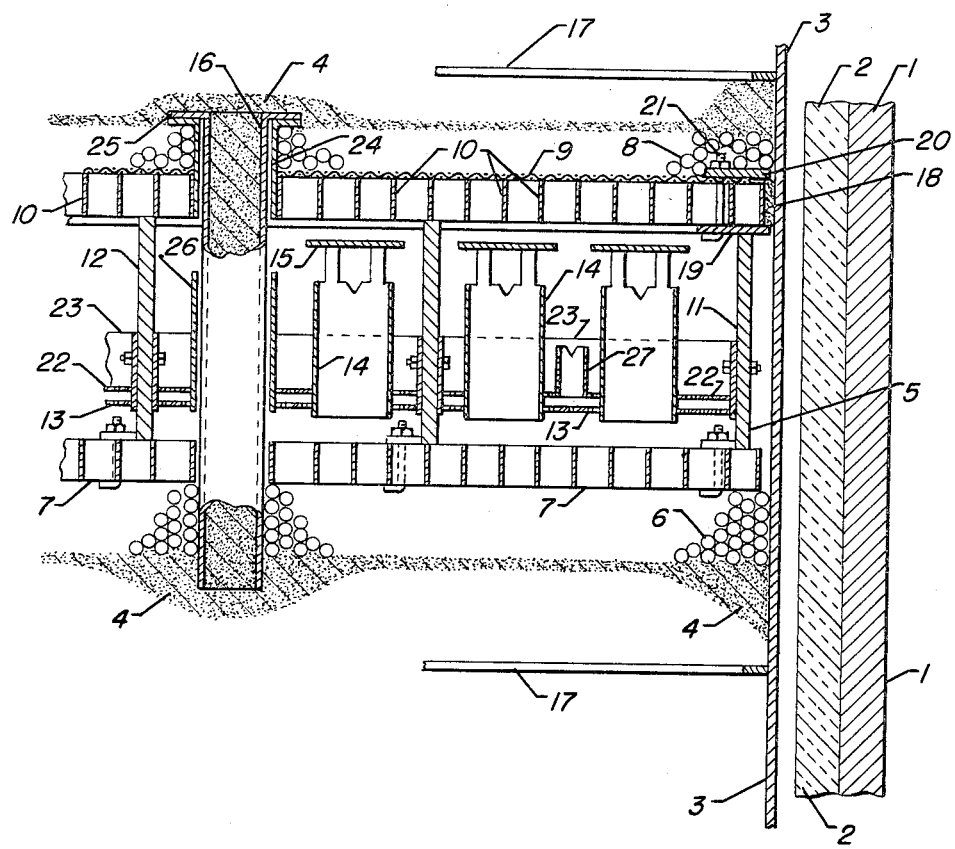

FIGURE 2 of the drawing shows, in a partial sectional view and in greater detail, the construction of one preferred embodiment of the present improved redistribution unit.

Referring now particularly to details shown in both FIGURES 1 and 2 of the drawing, there is indicated the external wall 1 of a reactor chamber having an internal insulating material 2 and an internal liner means 3, with contact material, such as catalyst 4, being distributed throughout substantially the entire length of the chamber. Within or between spaced beds of catalyst 4, as best shown by FIGURE 1, there will be one or more spaced fluid redistribution units 5 adapted to be supported by the bed of contact material itself. Actually, there is indicated in connection with the present embodiment a layer of fairly large ceramic balls 6 on top of a catalyst bed 4, which may be composed of relatively small subdivided particles. This arrangement provides that the lower grating 7 has relatively large particles or spheres to serve as the actual bearing surface for the redistribution unit. In a similar manner, there is indicated the use of a layer of ceramic balls or larger inert pellet means 8 above a screen 9 and grid 10 as a barrier layer between a superposed bed of catalyst particles 4 and the upper surface portion of the redistribution unit 5.

In the redistribution unit 5, as shown in FIGURE 1, there is a peripheral ring member 11 extending between the lower grating section 7 and upper grate or grid member 10 so that there is a tying together of the entire section in a rigid manner. In addition there are cross ribs or beam members 12 with an intermediate positioning such that there is effected ample rigidity and strength to the entire central portion of the redistribution unit. The attachment of the grating to the upper and lower grates, to the rib members and to the peripheral member 11 may be accomplished by suitable bolting or welding procedures. Generally the various members or sections of the unit will be fabricated as relatively small items whereby they may be inserted through suitable manhole means into the interior of the chamber and therein bolted or otherwise connected into a unitized assembly.

Spaced a short distance above the lower grate 7 is a suitable perforate plate member 13 to collect fluid from a next higher contact bed. Attached to and extending upwardly from the latter are a plurality of open-ended tubular section 14 which serve as vapor pipes and also as liquid overflow downpipes in those cases where a liquid phase may reach a high level above the surface of perforate plate 13. Spaced above the tops of the open-ended tubes 14 are cover plates 15 which preclude the direct bypassing of any descending liquid flow downwardly to a next lower contact bed rather than the collection and redistribution from the perforate plate member 13.

As indicated previously hereinbefore, the design of the perforate plate means, such as 13, is to provide some retention or build-up of liquid thereabove, or a slight buildup of pressure head with respect to a vapor phase flow, in order to insure a relatively uniform passage and rain-like flow of fluid from the redistributor downwardly to the next lower contact bed. Also, as shown in FIGURE 1, there is a catalyst withdrawal pipe 16 arranged to be positioned entirely through the redistribution unit 5 and embed itself within upper and lower contact beds 4 whereby there may be catalyst withdrawal from the entire reactor chamber by way of a lower nozzle means such as 17' (or by way of manhole means not shown). The catalyst withdrawal tube 16 will, during installation and operating conditions, be filled with catalytic material 4 such that any vapors or liquids passing through this small cross-sectional area will not in any way bypass catalyst contact by flowing through a low pressure-drop zone. Generally, the open-ended tubular means 16 will be fabricated separately and positioned in a sliding manner through the redistributor unit means 5. Preferably the tube is merely supported or guided from the latter in a spaced manner to insure that the upper and lower ends of the tube 16 are in contact with the catalyst material 4, i.e. above and below the zones of the respective layers of ceramic ball material 8 and 6.

As better shown in FIGURE 2 of the drawing, there may be small spaced lugs or ring means, such as 17, connected with the inner liner 3 of the chamber such that when all catalyst within the chamber has been removed there is a temporary means for effecting the support of the redistributor means 5 within the chamber 1 and the maintaining of its general position therein. Of course, during the placement of the catalyst or contact material and the more accurate positioning of the redistribution deck means, there will be a lifting of the deck unit 5 to a point well above the lower lug or ring means 17 such that there is the actual floating or supporting of the entire deck and redistribution unit on the top of the catalyst bed 4 and the layer of ball means 6 and the preclusion of any direct loads onto the side of the liner means 3 or to the outer side wall of the chamber. Also, as a further detail of installation, as best shown in FIGURE 2 of the drawing, there is provision for the placement of suitable packing means 18 around the entire periphery of the redistribution unit 5 such that there will be no direct leakage or bypassing of vapor or liquid to a lower bed of contact material around the upper grid deck means 10 or screening 9. In this instance, the packing 18 is held between a suitable lower clamp ring 19 and an upper clamp ring 20 with bolts 21 extending between the two rings.

As a particular feature of construction to provide an improved operation and as previously set forth briefly hereinbefore, there is provided a double perforate deck means in the embodiment of FIGURE 2 whereby there is a lower perforate plate 13 and a spaced apart upper perforate plate 22, with the latter having a fewer number of holes or slot means such that there is a definate hold up of liquid above the upper deck means 22. This arrangement insures a better distribution for low flow rates as well as high flow rates. Also as an addition to the design of FIGURE 1, there is indicated in FIGURE 2 of the drawing the use of tranverse vertical baffle members 23 which extend in a spaced apart arrangement at substantially right angles to the transverse beam member 12. Thus, above the surface of the upper rain deck 22 there are a plurality of resulting sectionalized or compartmentalized liquid retaining zones. This arrangement is of particular advantage in connection with an uneven or slightly tipped redistribution section. In other words, where there are a plurality of compartments and each is capable of reacting as a liquid retaining zone there is precluded the entire shifting of all of the liquid flow to one side of the redistribution unit 5 as would exist in an unbaffled construction.

As a still further detail of the detailed embodiment of FIGURE 2, there is shown a suitable bracket or support means 24 from the upper grating means 10 so as to in turn provide means for holding a flange portion 25 around the catalyst withdrawal tube 16. In addition, there is the placement of a circumferential baffle or liquid retaining sleeve 26 extending upwardly from the rain deck means 13 and 22. The sleeve 26 passes around the central portion of the open-ended catalyst withdrawal tube means 16 whereby the liquid retained above rain deck 22 will not be channeled in a concentrated flow around the withdrawal tube 16.

Generally, the present improved design of the redistribution unit 5 in the over-all reactor system is such as to accommodate a generally downward flow of the reactant stream which may be vapor, liquid or a mixed phase while in an intermediate position between spaced beds of catalyst, and contact material. However, a similarly constructed deck may well be utilized along the upper surface of an uppermost bed of catalyst or contact material within a reactor to in turn insure an initial distribution of fluid flow downwardly into the first contact zone of the reactor system. In a top positioned unit there may be the elimination of the catalyst withdrawal tube 16. Also, an upper distribution section may have a greater depth of screen means 9 which in effect is in the nature of a mist extraction construction or mesh blanket arrangement. On the other hand, the one or more layers of screening means 9 of the redistribution unit 5, will be chosen to have sufficient strength and a mesh size to accommodate the handling of a superposed catalyst support material, such as ceramic ball means or other inert spherical means, and catalyst bed material which in turn is superimposed above the ball means 8. However, preferably there shall be sufficient open area through the screen means 9 and the open support grating 10 so as to preclude any direct hold up of reactant stream material above the top surface of the redistribution section.

In still another modification, there may be spaced apart short open-ended tube means, such as 27 which will extend above the top perforate plate member 22 to provide for an overflow of liquid where the flow rate is such as to build up on this upper deck 22. The overflow liquid will then flow to the top of the lower perforate plate means 13 where a greater number of holes or slots will readily redistribute the entire liquid flow to next lower zone.

We claim as our invention:

1. A unitary reactor system with transverse fluid distributor means adapted to be supported on and between beds of subdivided contact material maintained therein, which comprises in combination, a pressure tight reactor chamber with fluid inlet and fluid outlet means thereto providing for fluid flow longitudinally therethrough, at least one relatively compact bed of subdivided contact particles maintained within said reactor unit, and at least one fluid stream distributing section positioned transversely within the interior of the unit supported solely by and upon said bed of contact particles therein, with such section comprising, a lower supporting grating sized to traverse the interior cross-section of the reactor chamber without attaching thereto, a peripheral ring section extending upwardly from said support grating and spaced a short distance inwardly from the inner wall of said reactor, a plurality of spaced parallel transverse support ribs extending upwardly from said support grating for a height equal to said ring section, perforate plate means above said grating providing uniform fluid passageway means for a descending fluid flow, a plurality of spaced apart open-ended fluid flow tubes extending through said perforate plate means for a short distance thereabove providing for both vapor and liquid flow through said distributor section, a plurality of spaced transverse vertical baffle members extending upwardly from said perforate plate means at right angles with respect to said support ribs, to provide a crate arrangement and a substantially uniform downward liquid flow across and through said perforate plate means, and particle retaining stiffened screening means extending laterally over said support ribs and said peripheral ring to preclude solid material passing to said perforate plate means of the distributor section.

2. The reactor of claim 1 further characterized in that said perforate plate means extending across said distributing section comprises two separate spaced apart perforated plate members, with the upper perforate member having slightly less open cross-sectional area than the lowermost perforate plate member whereby there will be a controlled rate of flow for a wide range of liquid flow rates.

3. The reactor system of claim 2 still further characterized in that short, spaced apart open-ended tubular members extend through the above said upper perforate member whereby a built up liquid level on such member can overflow to the lowermost perforate plate member that has a greater open area therethrough.

4. The reactor system of claim 1 further characterized in that at least one elongated open ended tubular member is provided through a central portion of the transverse distributing section and such open ended tubular member extends both above and below the distributing section for a sufficient distance to be embedded within the superposed and lower subdivided beds of contact material maintained within the reactor with respect to a distributing section.

5. The reactor system of claim 1 further characterized in that the particle retaining screening means extending laterally over the upper portion of the distributor section comprises a structurally strong open support grate member and at least one layer of superposed screening with a mesh size to preclude the passage of superposed subdivided contact material.

6. The reactor system of claim 1 further characterized in that the interior wall portion of the reactor chamber is provided with vertically spaced apart plate members positioned above and below the normal positioning of a distributing section within the reactor, whereby there may be a temporary support of the distributing section at such time as there is an absence of subdivided contact material within the reactor.

7. A fluid redistribution section adapted for transverse placement within the interior of a vertically positioned contact chamber and adapted to be supported solely by and upon contact material therein, which comprises in combination, a lower supporting grating sized to transverse the interior cross-section of the chamber without attaching to the inner wall of said chamber, a peripheral ring section extending upwardly from said support grating and spaced a short distance inwardly from the inner wall of said chamber, a plurality of spaced parallel transverse support ribs extending upwardly from said support grating for a height equal to said ring section, perforate plate means above said grating providing uniform fluid passageway means for a descending fluid flow, a plurality of spaced apart open-ended fluid flow tubes extending through said perforate plate means for a short distance thereabove providing for both vapor and liquid flow through said distributor section, a plurality of spaced transverse vertical baffle members extending upwardly from said perforate plate means at right angles with respect to said support ribs, to provide a crate arrangement and a substantially uniform downward liquid flow across and through said perforate plate means, and particle retaining screening means extending laterally over said support ribs and said peripheral ring to preclude solid material passing to said perforate plate means of the distributor section.

References Cited
UNITED STATES PATENTS

| | | | |
|---|---|---|---|
| 3,112,256 | 11/1963 | Young et al. | 23—288 XR |
| 3,235,344 | 2/1966 | Dreyer et al. | 23—289 |
| 3,052,527 | 9/1962 | Andrus | 23—288 |
| 3,167,399 | 1/1965 | Hansen | 23—288 |

MORRIS O. WOLK, Primary Examiner

D. G. MILLMAN, Assistant Examiner

U.S. Cl. X.R.

23—284, 288; 261—94